(12) United States Patent
Lashkari et al.

(10) Patent No.: US 9,795,899 B2
(45) Date of Patent: Oct. 24, 2017

(54) MEMBRANE SEPARATION AT HIGH TEMPERATURE DIFFERENTIAL

(71) Applicant: Chemetics Inc., Vancouver (CA)

(72) Inventors: Siamak Lashkari, Vancouver (CA); Thomas Stanley Drackett, North Vancouver (CA); David Alexander Summers, Vancouver (CA); Roza Tizvar, Vancouver (CA); Felix Man Fai Mok, Vancouver (CA); Paul Darcy Kozak, Surrey (CA); Jurgen Erich Hinze, Vancouver (CA)

(73) Assignee: Chemetics Inc., Vancouver (CA)

( * ) Notice: Subject to any disclaimer, the term of this patent is extended or adjusted under 35 U.S.C. 154(b) by 48 days.

(21) Appl. No.: 14/721,875

(22) Filed: May 26, 2015

(65) Prior Publication Data

US 2015/0343330 A1 Dec. 3, 2015

Related U.S. Application Data

(60) Provisional application No. 62/004,162, filed on May 28, 2014.

(51) Int. Cl.
*B01D 19/00* (2006.01)
*B01D 69/10* (2006.01)
(Continued)

(52) U.S. Cl.
CPC ..... *B01D 19/0073* (2013.01); *B01D 19/0005* (2013.01); *B01D 19/0031* (2013.01);
(Continued)

(58) Field of Classification Search
CPC ............ B01D 19/0031; B01D 19/0068; B01D 19/0073; B01D 53/22; B01D 69/10; B01D 69/12; C01B 11/028
See application file for complete search history.

(56) References Cited

U.S. PATENT DOCUMENTS 4,683,039 A * 7/1987 Twardowski ............. C25B 1/26
205/500
5,009,875 A 4/1991 Kelley et al.
(Continued)

FOREIGN PATENT DOCUMENTS

WO 2008/035130 A2 3/2008

OTHER PUBLICATIONS

US Environmental Protection Agency, "Stage 1 and Stage 2 Disinfectants and Disinfection Byproduct Rules," Table 4-1. Commercial Chlorine Dioxide Generators on p. 4-5; http://www.epa.gov/ogwdw/mdbp/pdf/alter/chapt_4.pdf., Nov. 2015.
(Continued)

*Primary Examiner* — Jason M Greene
(74) *Attorney, Agent, or Firm* — Seed IP Law Group LLP (57) ABSTRACT

A gaseous species can be separated from an aqueous donor mixture and absorbed in an aqueous recipient mixture using a membrane separation apparatus while maintaining a large temperature difference (e.g. greater than 30° C.) between the two aqueous mixtures. A composite membrane is employed which comprises a non-porous membrane adjacent a porous membrane. The non-porous membrane is permeable to the gaseous species. The porous membrane has a porosity greater than 50% and is hydrophobic. In one embodiment, the composite membrane is oriented such that the porous membrane faces the aqueous recipient mixture and is impermeable thereto at the recipient mixture pressure. The invention is particularly suitable for separating chlorine dioxide from chlorine dioxide reaction liquor and absorbing in chilled water.

16 Claims, 3 Drawing Sheets

(51) Int. Cl.
*C01B 11/02* (2006.01)
*C01B 7/07* (2006.01)

(52) U.S. Cl.
CPC ........ *B01D 19/0068* (2013.01); *C01B 7/0743* (2013.01); *C01B 11/023* (2013.01); *C01B 11/026* (2013.01); *C01B 11/028* (2013.01)

(56) References Cited

U.S. PATENT DOCUMENTS

| | | | | |
|---|---|---|---|---|
| 5,078,755 | A * | 1/1992 | Tozawa | B01D 19/0031 95/46 |
| 5,965,004 | A * | 10/1999 | Cowley | B01D 61/00 205/499 |
| 5,993,515 | A * | 11/1999 | Sirkar | B01D 69/12 210/321.8 |
| 6,143,675 | A | 11/2000 | McCollam et al. | |
| 6,149,817 | A * | 11/2000 | Peterson | B01D 19/0031 210/321.78 |
| 6,447,679 | B1 * | 9/2002 | Watari | B01D 19/0031 210/490 |
| 6,716,352 | B1 | 4/2004 | Livingston | |
| 2005/0230856 | A1 * | 10/2005 | Parekh | B01D 19/0031 261/122.1 |
| 2006/0081524 | A1 * | 4/2006 | Sengupta | B01D 19/0031 210/321.88 |
| 2006/0269735 | A1 | 11/2006 | Wang et al. | |
| 2008/0142441 | A1 * | 6/2008 | Pashley | B01D 19/0031 210/640 |
| 2010/0189631 | A1 * | 7/2010 | Noszticzius | C01B 11/028 423/477 |
| 2012/0157905 | A1 * | 6/2012 | Sehgal | B01D 19/0031 604/5.04 |
| 2016/0008766 | A1 * | 1/2016 | Aburaya | B01D 69/12 422/222 |

OTHER PUBLICATIONS

Advertising literature for CDA-22 Chlorine Dioxide Analyzer, 1 page, no Date.

* cited by examiner

MEMBRANE SEPARATION AT HIGH TEMPERATURE DIFFERENTIAL

TECHNICAL FIELD

The present invention pertains to methods for separating a gaseous species from an aqueous donor mixture and absorbing in an aqueous recipient mixture when there is a large temperature difference between the two mixtures. In particular, it pertains to methods for separating chlorine dioxide from chlorine dioxide reaction liquor and absorbing in chilled water. The invention also pertains to a combined chlorine dioxide generator and absorber employing the method.

BACKGROUND

In the industrial production of certain chemicals, a desired product may preferably be produced at one temperature but then subsequently may preferably undergo separation operations or other handling at another temperature. For process simplification and capital savings, if possible it can be advantageous to perform such separation operations over the temperature difference involved. For instance, chlorine dioxide is typically prepared in a reaction liquor at elevated temperature but for safety reasons is subsequently handled in low concentration, lower temperature aqueous solution.

Chlorine dioxide offers advantageous properties for various industrial uses and is particularly desirable for use as an elemental chlorine free bleaching agent, such as in the pulp and paper industry, or as a disinfectant, as in water purification and the like. Chlorine dioxide however is very unstable and can decompose vigorously if certain temperature, pressure, and/or concentration limitations are exceeded. For these reasons, chlorine dioxide is usually generated at the point of use and must be handled carefully. And as mentioned, for handling purposes, it is generally prepared in low concentration aqueous solutions.

Chlorine dioxide is typically generated chemically from either chlorate (e.g. sodium chlorate) or chlorite (e.g. sodium chlorite) precursors. Although the former precursors are less expensive, chlorine dioxide production from them is generally economic only for large industrial applications since relatively complex, expensive production systems are required. For smaller applications (e.g. sterilizing medical equipment), chlorite precursors are generally employed.

Chlorine dioxide can be generated from reactions of chlorate precursor and an appropriate reducing agent, e.g. hydrochloric acid, sulphur dioxide, methanol, hydrogen peroxide, manganese porphyrin. In an exemplary industrial process, an aqueous stream of HCl-acidified sodium chlorate solution is prepared, allowed to react while under suitable control, and product chlorine dioxide is continually removed from the solution. Chlorine dioxide can be generated in numerous ways from reactions of chlorite precursor and a variety of other reactants, including oxidizing agents and acids.

Industrial systems for producing chlorine dioxide typically involve some gas phase production and handling during the production even though the final product is provided in solution form. For instance, dilute chlorine dioxide gas may be generated and then later absorbed into chilled water during production for immediate use and/or storage. Often, air dilution is required for safety reasons. And the reaction kinetics may not be ideal if reaction product can not practically be removed as quickly as desired in the generator. Further, chlorine gas is a side product of a competing reaction in the production process. While this competing reaction can be minimized and side product chlorine can be separated from the chlorine dioxide to a great degree, some chlorine typically remains as an undesirable impurity in the product chlorine dioxide solution. An exemplary integrated chlorine dioxide process for pulp bleaching applications is described in "Adopting The Integrated Chlorine Dioxide Process For Pulp Bleaching, To Comply With CREP Regulations", IPPTA J. Vol. 21, No. 1, January-March, 2009, p 123.

U.S. Pat. No. 4,683,039 discloses a method for the formation of an aqueous product solution of chlorine dioxide involving generating a donor medium comprising chlorine dioxide in a chlorine dioxide generator and then transferring gaseous chlorine dioxide through a membrane by pervaporation to a recipient aqueous medium. The membranes must be sufficiently porous to permit the flow of gases therethrough but sufficiently hydrophobic to prevent the passage of aqueous solution therethrough. Expanded polytetrafluoroethylene was considered suitable. While offering certain advantages, the problem of chlorine contamination remained. Chlorine was either allowed to pass through as well into the product or it was suggested that the recipient medium be acidified to inhibit dissolution of chlorine therein. However, acidifying the recipient medium does not eliminate chlorine dissolution. Either way, costly and complicated subsequent treatment to remove chlorine may be required.

WO2008035130 discloses methods to prepare fluids containing pure chlorine dioxide which are not contaminated by the starting materials or the byproducts of the chlorine dioxide synthesis or to deliver pure chlorine dioxide into any medium capable of dissolving chlorine dioxide. The chlorine dioxide generated in the process is transported across a pore free polymeric membrane via selective permeation into the target medium. The methods may be suitable for syntheses which do not involve by-product chlorine gas and/or for certain applications such as disposable devices. The membranes discussed have very high selectivity for the byproducts because their permeability is at least 3 orders of magnitude lower for the contaminating components compared to that of chlorine dioxide. However, the membranes discussed, e.g. silicone rubber, are not suitable for reasons of corrosion resistance for use in applications involving long term exposure to corrosive chlorine.

The use of chlorine dioxide in various applications continues to increase. There thus still remains a need to develop better methods and systems for producing chlorine dioxide, particularly at the industrial level. The present invention addresses this need and provides other benefits as disclosed below.

SUMMARY

A method has been developed for separating a gaseous species from an aqueous donor mixture and absorbing it in an aqueous recipient mixture, using a membrane separation apparatus, while maintaining a large temperature difference between the two aqueous mixtures. The membrane separation apparatus comprises a composite membrane comprising a non-porous membrane adjacent a porous membrane. The non-porous membrane is permeable to the gaseous species, but limits the transfer of hot water through to the recipient mixture. The porous membrane has a porosity greater than 50% and is hydrophobic. In a desirable embodiment, the composite membrane is oriented such that the non-porous membrane faces the aqueous donor mixture and the porous membrane faces the aqueous recipient mixture and the porous membrane is impermeable to the aqueous recipient mixture at the recipient mixture pressure. The pores in the porous membrane thus do not wet and are instead filled with gases. The gas filled porous membrane provides better thermal insulation than a solid non-porous membrane or a fully wetted porous membrane would.

The method is particularly suitable for separating chlorine dioxide from chlorine dioxide reaction liquor and absorbing in chilled water. Sufficient thermal insulation is provided such that chlorine dioxide can be separated directly from hot chlorine dioxide reaction liquor and absorbed directly into chilled water. In the aforementioned U.S. Pat. No. 4,683,039, a significant problem of heat transfer from the donor to recipient mixture via hot water vapor transmission through the membrane was not apparent. This problem is resolved using the present method. Further, in the present method, use of a non-porous membrane material that is preferentially selective for chlorine dioxide over chlorine results in a much reduced transfer of chlorine contaminant from donor to recipient mixture. The non-porous membrane material does not have to be orders of magnitude more selective for chlorine dioxide than chlorine in order to be useful in practice. For instance, polytetrafluoroethylene may be a suitable non-porous membrane material and its selectivity for chlorine dioxide over chlorine has been reported in the art as being about 3.1 to 1.

Specifically, the method of the invention involves separating a first gaseous species from an aqueous donor mixture and for absorbing the separated first gaseous species in an aqueous recipient mixture using a membrane separation apparatus. The temperature of the aqueous donor mixture is more than 30° C. greater than that of the recipient mixture and the pressure of the aqueous donor mixture is greater than that of the recipient mixture (e.g. in the range from about 10 to 150 psig greater). The method steps include providing a suitable composite membrane comprising a non-porous membrane adjacent a porous membrane in the membrane separation apparatus, directing the aqueous donor mixture over the surface of the non-porous membrane in the composite membrane at the donor mixture pressure, and directing the aqueous recipient mixture over the surface of the porous membrane in the composite membrane at the recipient mixture pressure. In a suitable composite membrane, the non-porous membrane is permeable to the first gaseous species and the porous membrane has a porosity greater than 50%, is hydrophobic, and impermeable to the aqueous recipient mixture at the recipient mixture pressure.

In certain embodiments, the aqueous donor mixture comprises a second gaseous species, and the non-porous membrane is permeable to the second gaseous species. For instance, for use in the production of chlorine dioxide, the first gaseous species is chlorine dioxide and the second gaseous species is chlorine. Further, in the production of chlorine dioxide, the method can include generating chlorine dioxide reaction liquor in which the aqueous donor mixture is the reaction liquor. Advantageously, the liquor can be generated and the separation can be performed in the same apparatus (i.e. the chlorine dioxide reaction liquor is generated in the membrane separation apparatus).

As is common in the production of chlorine dioxide, the aqueous recipient mixture can be chilled water having a temperature of less than 10° C. Further, the temperature of the aqueous donor mixture can be greater than 50° C.

Suitable materials for the non-porous membrane material include fluoropolymers, for instance polytetrafluoroethylene (PTFE), fluorinated ethylene propylene (FEP), ethylene tetrafluoroethylene (ETFE), ethylene chlorotrifluoroethylene (ECTFE), polychlorotrifluoroethylene (PCTFE), perfluoroalkoxy polymer (PFA), and polyvinylidene fluoride (PVDF), and certain other polymers such as polypropylene (PP), polyether ether ketone (PEEK), and polysulfone (PS). In certain preferred embodiments, the non-porous membrane is also hydrophobic, and in such a case PS would not be considered. A suitable thickness for the non-porous membrane is in the range from about 0.1 to 50 micrometers. As mentioned above, in the production of chlorine dioxide, the non-porous membrane does not have to be orders of magnitude more selective for chlorine dioxide than chlorine in order to be practical. The selectivity can for instance be in the range from about 1 to 1000.

In order that the porous membrane is impermeable to the aqueous recipient mixture at the recipient mixture pressure, the average pore size of the porous membrane may be kept below about 1 micrometer. Suitable materials for the porous membrane material include fluoropolymers, such as PTFE, FEP, ETFE, ECTFE, PCTFE, PFA, and PVDF, along with certain other polymers such as PP and PEEK. A suitable thickness for the porous membrane is in the range from about 500 to 5000 micrometers. An exemplary porous membrane is an expanded plastic, for instance expanded PTFE.

In certain embodiments, it can be advantageous to include other membrane components in the composite membrane. For instance, the composite membrane can comprise additional non-porous and/or porous membrane components. In a desirable embodiment, the composite membrane comprises an additional, second porous membrane adjacent the non-porous membrane on the surface opposite the other porous membrane. The second porous membrane also has a porosity greater than 50% and is hydrophobic.

The invention also includes a combined chlorine dioxide generator and absorber employing the aforementioned methods. Such a combined chlorine dioxide generator and absorber comprises apparatus for generating chlorine dioxide reaction liquor, and apparatus for separating chlorine dioxide from the chlorine dioxide reaction liquor and for absorbing the separated chlorine dioxide in an aqueous recipient mixture according to the aforementioned methods.

In the combined chlorine dioxide generator and absorber, the apparatus for separating and absorbing chlorine dioxide comprises the membrane separation apparatus which comprises a donor mixture compartment and a recipient mixture compartment separated by the composite membrane. The apparatus for separating and absorbing chlorine dioxide also comprises apparatus for directing the aqueous recipient mixture to the recipient mixture compartment and over the other surface of the composite membrane, and apparatus for directing the aqueous donor mixture to the donor mixture compartment over the one surface of the composite membrane at a temperature more than 30° C. greater than that of the recipient mixture and at a donor mixture pressure greater than that of the recipient mixture. In a simple configuration, the chlorine dioxide reaction liquor is actually generated in the donor mixture compartment of the membrane separation apparatus.

A variety of conventional configurations may be employed for the composite membrane. For instance, in an exemplary embodiment, the composite membrane comprises a plurality of hollow fibres.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and are not limited to just one.

In a numerical context, the word "about" is to be construed as meaning plus or minus 10%.

The present invention provides a means for separating gaseous species from an aqueous donor mixture to an aqueous recipient mixture using membrane separation techniques when the former mixture is at a significantly greater temperature than the latter mixture (e.g. more than 30° C. greater). It is particularly useful for the separation of difficult to handle chlorine dioxide from reaction liquor and allows for the reaction liquor to be generated in the same apparatus used for the membrane separation process.

A composite membrane is employed in the inventive method which comprises a non-porous (i.e. hydraulically impermeable) membrane adjacent a suitable porous membrane. While either orientation is possible, the composite membrane is preferably oriented such that the non-porous membrane component faces the donor mixture while the porous membrane component faces the recipient mixture. The non-porous membrane component should have some significant permeability to the gaseous species to be separated. It is provided to prevent any significant transmission of water vapor, and particularly the heat associated with that vapor, through the composite membrane which would otherwise occur if a porous membrane were solely employed. The non-porous membrane component can be, and desirably is, relatively thin (e.g. from 0.1 to 50 micrometers thick) since a thin such component will allow for greater transmission of the gaseous species while still effectively preventing transmission of water vapor and associated heat.

A relatively thin non-porous membrane component does not however prevent a substantial amount of heat transfer via conduction from the donor mixture to the recipient mixture. That however is a function of the porous membrane component in the composite membrane. A suitable porous membrane component allows for transmission of the gaseous species and provides an insulating vapor barrier between the donor and recipient mixtures. To function in this manner, the porous membrane component should not wet nor allow for the recipient mixture to permeate its pores. The porous membrane component is thus selected to be hydrophobic and impermeable to the aqueous recipient mixture at the recipient mixture pressure. And to provide suitable insulation, a substantial amount of the volume occupied by the porous membrane component should be vapor and not membrane solids. Thus, the porous membrane component generally has a porosity greater than 50%. Further, the porous membrane component can be, and desirably is, relatively thick (e.g. from 500 to 5000 micrometers thick) since a thicker such component still readily allows for the passage of the gaseous species while providing greater insulating vapor barrier. And further still, a thicker porous membrane component can usefully provide support for the non-porous membrane component in the composite.

Both the non-porous and the porous membrane components should be chemically compatible with the aqueous donor and recipient mixtures involved and able to withstand the temperatures and pressures involved. The conditions experienced in the production of chlorine dioxide can be quite harsh as the solutions involved can contain high concentrations of acid and the strong oxidizers chlorine and chlorine dioxide.

The aqueous donor mixture may contain additional gaseous species which need to be considered in the separation. In some cases, it may not matter if these additional species permeate through the composite membrane and absorb in the recipient mixture as well. And in other cases, the non-porous membrane may be sufficiently selective to allow the gaseous species to permeate adequately while practically preventing the additional species from permeating. In certain embodiments however, a first gaseous species may desirably be separated from a second gaseous species present in the donor mixture and yet the non-porous membrane is permeable to some significant extent to both. Still, if the concentration of the second gaseous species is relatively low compared to that of the first gaseous species, and if the non-porous membrane has a reasonable selectivity for the first gaseous species over the second gaseous species, an adequate separation can often still be obtained. For instance, this can be the case when separating chlorine dioxide from chlorine dioxide reaction liquor which can also comprise small amounts of undesirable chlorine. Here, PTFE can be an adequate material for the non-porous membrane even though its selectivity for chlorine dioxide over chlorine is relatively modest (approximately 3:1).

Figure 1:
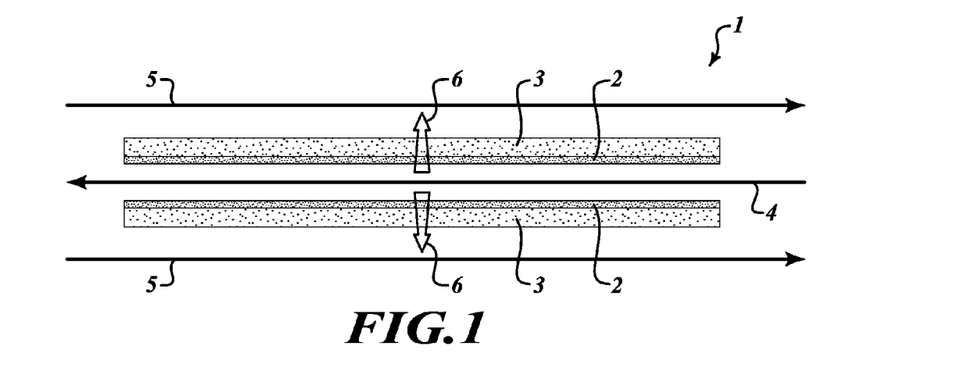
FIG. 1 shows a schematic illustrating the method of separating chlorine dioxide from a donor mixture and absorbing in a recipient mixture using a composite membrane in accordance with the invention.

FIG. 1 shows a schematic illustrating a method of separating chlorine dioxide from a donor mixture and absorbing in a recipient mixture using a composite membrane in accordance with the invention. In FIG. 1, only the composite membrane and the flows of the various fluids involved are shown. And while various configurations for the composite membrane may be employed, FIG. 1 schematically depicts a hollow fibre composite membrane configuration in cross-section.

Composite membrane 1 comprises non-porous membrane 2 and adjacent porous membrane 3. Chlorine dioxide reaction liquor 4 is directed (bold arrow) over the surface of non-porous membrane 2 at a donor mixture pressure. In a counter flow direction, chilled water 5 is directed (bold arrows) over the surface of porous membrane 3 at a recipient mixture pressure. In a typical embodiment, the temperatures of the donor chlorine dioxide reaction liquor and chilled water recipient mixtures may be about 60° C. and 10° C. The pressure of the supplied donor chlorine dioxide reaction liquor may be about 10 to 150 psig greater than that of the supplied chilled water. Under these conditions, a substantial amount of chlorine dioxide 6 in chlorine dioxide reaction liquor 4 permeates composite membrane 1 and is absorbed into chilled water 5.

In an exemplary embodiment, non-porous membrane 2 is a thin (e.g. 25 micrometer) hydrophobic PTFE membrane material and porous membrane 3 is a thicker (e.g. 1 mm) hydrophobic expanded PTFE material. The partial pressure differences between the species in the chlorine dioxide reaction liquor and the chilled water provide the main driving force for the transport of gaseous chlorine dioxide across composite membrane 1. After passing through non-porous membrane 2, gas accumulates in the pores of porous membrane 3 thereby providing thermal insulation between the donor and recipient mixtures. Even in the event that porous membrane 3 loses its hydrophobicity (e.g. due to contamination), this accumulated gas can prevent flooding of porous membrane 3 to some extent.

Chlorine dioxide reaction liquor 4 comprises some undesirable chlorine which preferably is not carried over and absorbed into chilled water 5. Desirably, non-porous PTFE membrane 2 has a reasonable selectivity for chlorine dioxide permeation compared to that of chlorine (approximately 3:1 according to literature values). Given the lower concentration of chlorine than chlorine dioxide, this selectivity can be sufficient to reduce the chlorine permeating through composite membrane 1 to an acceptable level. Note too that permeated chlorine gas accumulates in the pores of porous membrane 3 thereby decreasing the rate of permeation through non-porous membrane 2. Further, modifications may be considered to the aqueous recipient mixture in order to reduce chlorine absorption and hence contamination. For instance, chilled water 5 can be acidified to render it selectively absorbent to chlorine dioxide over chlorine.

Use of composite membrane 1 allows for separation of chlorine dioxide from a much hotter chlorine dioxide reaction liquor 4 and for absorption into chilled water 5, while maintaining the temperature difference therebetween. In the event that it would be preferable to sacrifice some thermal insulation capability in order to obtain the benefits of a thinner, more permeable composite membrane, additional cooling streams may be considered in order to prevent a temperature rise in the chilled water absorbent. For instance, additional streams of cooling media or refrigerant could be used to cool down chilled water 5 by passing the cooling media parallel thereto but separated therefrom by a preferably thin membrane of highly impermeable material and high thermal conductivity (not shown in FIG. 1).

FIG. 1 shows a schematic of a simple embodiment for carrying out the method of the invention. Those skilled in the art will recognize that other arrangements may desirably be adopted for accomplishing separation in a more compact manner and/or for achieving more efficient cooling. For instance, a practical embodiment may comprise suitable stacks of parallel compartments (e.g. a stack comprising repeating units in which for instance each unit may consist of a stacked sequence of compartments for cooling media, recipient mixture, donor mixture, and recipient mixture. Such compartments can be fed from different manifolds and such stacks may be similar in geometry and flow passages to that of electrodialysis cells incorporating anion, cation, and even bipolar membranes. Alternatively, a membrane module arrangement might be considered using composite hollow fibers in which the composite fibres comprise an inner fiber provided inside an outer fibre. Reaction liquor or cooling medium might then be directed through the inner fibres while chilled water flows through the annular space around the nested composite hollow fibres. Cooling medium or reaction liquor would flow through the shell of the membrane module depending on which solution is used in the inner fibres.

In the prior art production of chlorine dioxide, the product gas is generated at a relatively high temperature in a first step, and then it must be cooled before it can be absorbed into chilled water in a second step. However, the invention advantageously allows the generation and absorption of chlorine dioxide to be accomplished at the same time in the same apparatus. Further, performance and controllability can be improved.

Figure 2:
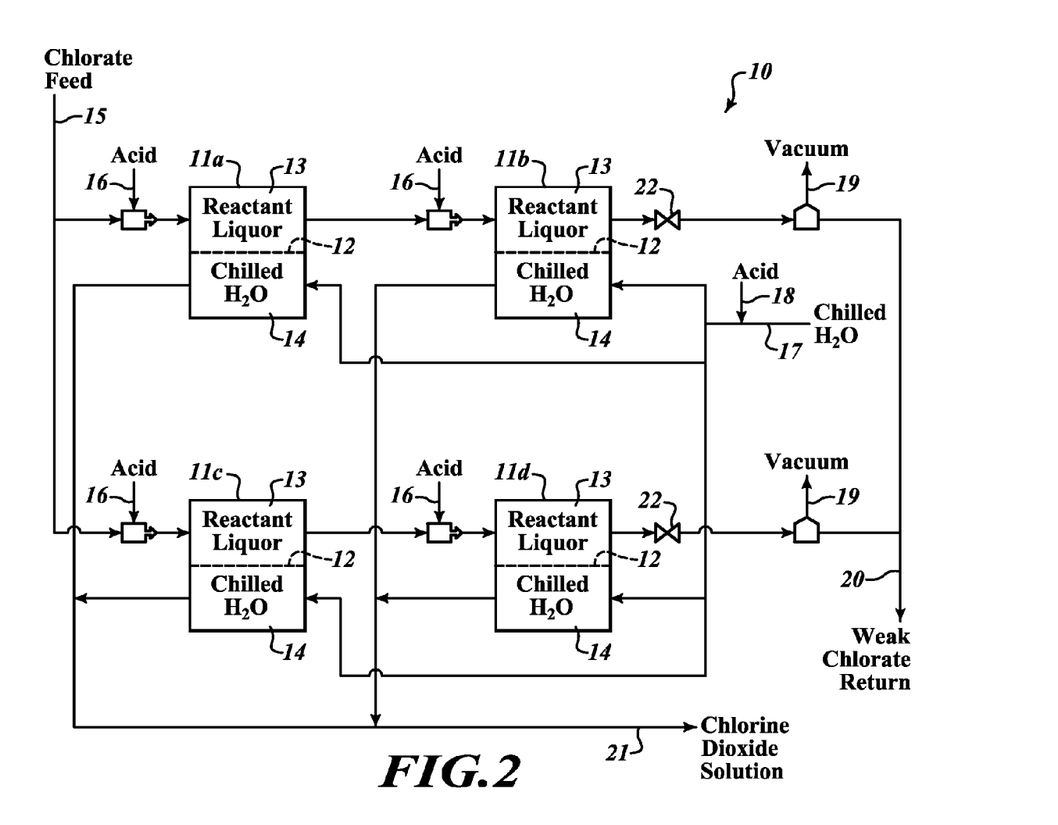
FIG. 2 shows a schematic of the internal configuration of an exemplary combined chlorine dioxide generator and absorber in which several membrane separation units are arranged in series and parallel.

In a practical embodiment, such a combined generator and absorber may involve a complex configuration comprising multiple membrane separation units in a series/parallel arrangement. FIG. 2 shows a schematic of the internal configuration of an exemplary combined chlorine dioxide generator and absorber with such an arrangement. Here, the membrane separation units are depicted as having flat sheet composite membranes separating donor and recipient mixture compartments in the membrane separation units.

Specifically in FIG. 2, combined chlorine dioxide generator and absorber 10 comprises four membrane separation units 11a, 11b, 11c, and 11d. As shown, unit 11b is in series with unit 11a, and unit 11d is in series with unit 11c. And the series combination of units 11a and 11b is arranged in parallel with the series combination of units 11c and 11d. Each membrane separation unit comprises composite membrane 12 in accordance with the invention. And composite membranes 12 separate each of the membrane separation units into donor mixture compartments 13 and recipient mixture compartments 14.

Feedstock for generating chlorine dioxide is supplied at feed 15. A suitable feedstock is a heated aqueous solution of sodium chlorate. Just before entering each membrane separation unit, the feedstock is acidified (e.g. with HCl or $H_2SO_4$) and other desired reactants (e.g. methanol) at reactant inlets 16. The reactions generating chlorine dioxide then start just as the solution enters the donor mixture compartments 13 of each unit to produce relatively hot chlorine dioxide reaction liquor. By the time, the liquor reaches membranes 12, most of the added reactant acid will have been consumed. Adding the acid and other reactants in this manner, before each stage, allows for optimized production as well as control of temperature and concentration.

Concurrently, chilled water 17 is provided to recipient mixture compartments 14 in each membrane separation unit. Acid may optionally be introduced into the chilled water at 18 to inhibit the absorption of chlorine if desired. The chlorine dioxide generated in combined chlorine dioxide generator and absorber 10 then permeates composite membranes 12 and is absorbed in chilled water 17 in accordance with the invention. The chlorine dioxide depleted reaction liquor then exits each unit. The liquor from the last membrane separation units in the two series passes through respective restriction valves 22 before vacuum 19 is drawn on the liquor to remove chlorine gas and any residual chlorine dioxide gas from the liquor. The parallel streams of evacuated chlorine dioxide depleted reaction liquor are then combined and exit combined chlorine dioxide generator and absorber 10 at outlet 20. In a like manner, the parallel streams of chilled aqueous chlorine dioxide solution are combined and exit at product outlet 21. The flow of the various fluids involved is generally indicated with arrows in FIG. 2.

Figure 3:
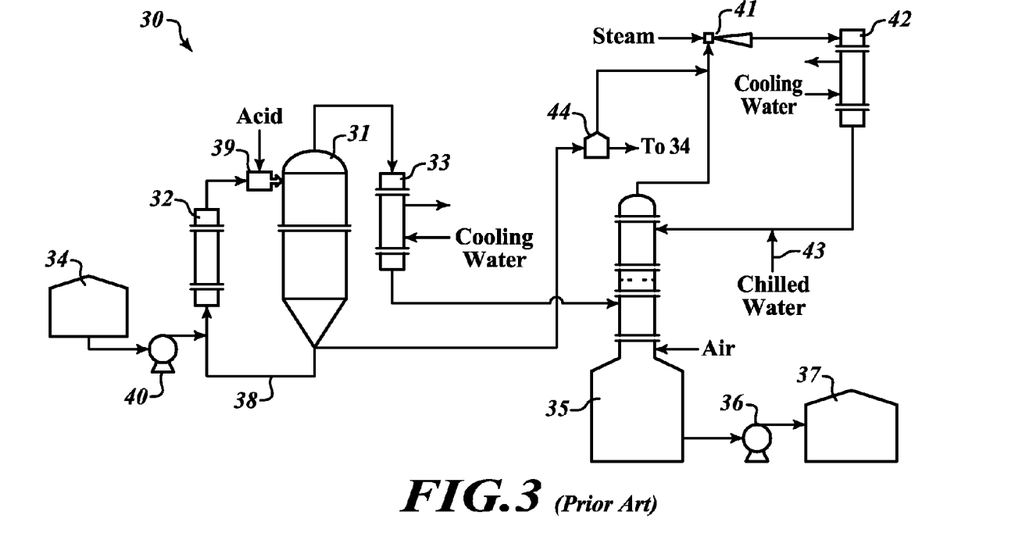
FIG. 3 shows a schematic of a prior art system for producing chlorine dioxide.
Figure 4:
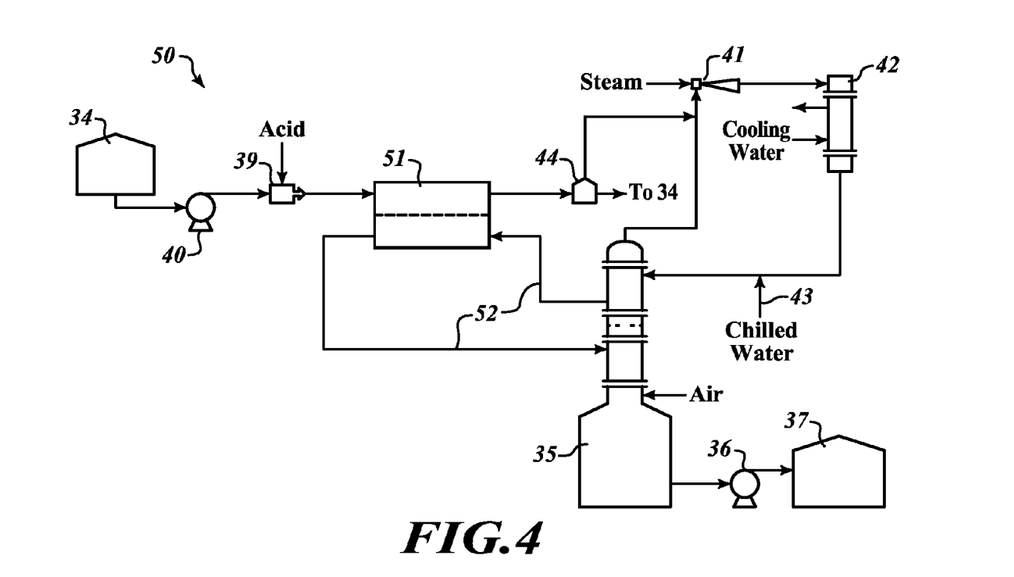
FIG. 4 shows a schematic of a simplified system for producing chlorine dioxide which employs a combined chlorine dioxide generator and absorber of the invention.

FIGS. 3 and 4 illustrate how use of the combined chlorine dioxide and absorber of the invention can simplify a chlorine dioxide production. FIG. 3 shows a schematic of prior art system 30 for producing chlorine dioxide. System 30 comprises chlorine dioxide generator 31, reboiler 32, and heat exchanger 33 which provides a cooled supply of generated chlorine dioxide gas. Hot chlorine dioxide gas containing water vapor is generated in generator 31 and is directed to heat exchanger 33 where it is cooled by exchanging heat with a stream of cooling water. The cooled chlorine dioxide gas is then directed to chlorine dioxide absorber/stripper 35 where it is absorbed into water to produce a weak chlorine dioxide solution. Air is injected into absorber/stripper 35 and is used to "strip" unwanted chlorine gas from the weak chlorine dioxide solution. After this, the chlorine dioxide solution is pumped by pump 36 to storage 37.

As in the process of FIG. 2, chlorine dioxide is generated here by reacting acid with chlorate solution. For this purpose, chlorate recycle loop 38 is provided which recycles strong chlorate solution through chlorine dioxide generator 31. Acid is added at 39, close to the inlet of generator 31, and reacts with the chlorate to produce chlorine dioxide within generator 31. Consumed chlorate is replenished using pump 40 to inject fresh chlorate from chlorate supply tank 34 into recycle loop 38. Reboiler 32 then reheats up the recycling chlorate stream up to the appropriate reaction temperature.

The bulk of the generated chlorine dioxide is readily removed and is directed to heat exchanger 33. However, a small amount remains in the recycling chlorate solution and is desirably removed as well. Thus, a small amount of the recycling chlorate solution is continually removed from recycle loop 38 just after it exits generator 31 and is directed to weak chlorate tank 44. There, chlorine dioxide is removed and afterwards the weak chlorate solution is returned to tank 34 where fresh strong chlorate will be added.

The additional apparatus shown in FIG. 3 is employed to remove and capture chlorine dioxide gas from weak chlorate tank 44 and also to capture any chlorine dioxide released in absorber/stripper 35. (It could also be employed to capture chlorine dioxide released from solution in storage 37—not shown in FIG. 3.) A steam injection vacuum system is used which comprises injector 41 supplied with steam, heat exchanger which cools by exchanging heat with a stream of supplied cooling water, and chilled water supply 43. The captured chlorine dioxide is absorbed by condensate produced from cooling down the stream in heat exchanger 42 and is then mixed and fully absorbed in chilled water from supply 43.

FIG. 4 however shows a schematic of a similar system to that of FIG. 3, except that it has been simplified by employing a combined chlorine dioxide generator and absorber of the invention. (Note that the same numerals have been used to identify items in FIG. 4 that are common to items in FIG. 3.) Simplified system 50 replaces chlorine dioxide generator 31, reboiler 32, heat exchanger 33, and chlorate recycle loop 38 of prior art system 30 with combined generator and absorbed 51 of the invention and chilled water recycle loop 52.

In chlorine dioxide production system 50, chlorate solution is pumped by pump 40 to the donor mixture compartment of combined generator and absorber 51. Reactant acid is added at 39 as before, i.e. just before entering the combined generator and absorber. As shown, a chlorate recycle loop is not required, and after reacting, the chlorate stream is entirely directed to weak chlorate tank 44. Chilled water is recycled through the recipient mixture compartment of combined generator and absorber 51 via chilled water recycle loop 52. The remaining components shown in system 50 are generally similar, and function similarly to, their respective components in prior art system 30.

Since the generated chlorine dioxide is essentially already in solution in chilled water recycle loop 52, the absorber section in absorber/stripper 35 can be made much smaller in size than in system 30, or may possibly be omitted entirely. Further, in a case where the composite membrane in combined generator and absorber 51 is sufficiently selective for chlorine dioxide that the amount of chlorine passing through to the chilled water recycle loop is sufficiently low, then there may be no need to employ absorber/stripper 35 at all. In that case, absorber/stripper 35 can be omitted from system 50 and the chlorine dioxide solution in chilled water recycle loop 52 can be sent directly to storage 37.

Use of the combined generator and absorber of the invention provides an obvious advantage with regards to eliminating equipment, such as reboiler 32 and gas heat exchanger 33, as well as with regards to reducing the amount of steam and cooling water required. Further, it is expected that the absorber section in absorber/stripper can at least be made smaller. However the invention offers other advantages as well.

The possibility of using membrane module designs having large membrane areas within can potentially reduce the size of the combined generator and absorber significantly. In turn, this and the other equipment reductions can result in reduced system layout and cost. Note also that the opportunity exists to use plastic materials in much of the equipment instead of expensive titanium, thereby additionally reducing cost. The modular capability of the system is enhanced, leading to reduced installation cost and improved control. And, it is expected that the combined generator and absorber can be readily integrated into existing commercial facilities.

Using appropriate composite membranes in combined generator and absorber 51, the possibility for a significant reduction in the amount of chlorine transferred to the recipient mixture exists. The transfer of water, oxygen, nitrogen, and other inert component through the membrane will not reduce the effective purity of the product chlorine dioxide solution. And because significant water transfer is prevented, along with any associated heat, there is no significant effect on concentration of donor or recipient mixtures due to water transfer.

Further still, there is minimal, if any, need for dilution gas to dilute the produced chlorine dioxide gas since it is generally removed as it is formed. And importantly, the reduction or elimination of the gas phase in the combined chlorine dioxide generator and absorber, combined with quick absorption of the product gas, should reduce the risk of spontaneous (and sometime explosive) decomposition of chlorine dioxide to chlorine and oxygen (known as "puffs" in the art), thereby resulting in a much safer and more easily operated system.

Finally, the quick removal of the chlorine dioxide reaction product into the stable, low temperature, diluted, aqueous solution in chilled water recycle loop 52 results in increased reaction efficiency and kinetics.

While the preceding description relates to a preferred embodiment of the invention for the production of chlorine dioxide, those in the art will appreciate that the method may be used in the separation of other species and the manufacture of other chemical products. And, other non-porous or porous component membranes may be included in the composite membrane. For instance, a composite in which the non-porous membrane is sandwiched between two suitable porous membranes may be considered. Further, a wide variety of membrane geometries and membrane products may be contemplated for use. For instance, flat sheet type or hollow fibre membranes may be considered. The flat sheet type may be advantageous in that higher porosities can commonly be obtained, e.g. 80-95%, as opposed to typically 45-60% in the hollow fibre type. The flat sheet type can be made into spiral wound modules or used in multi-compartment plate-and-frame modules. The hollow fibre type can be potted into shell and tube type modules, and other tubular geometries.

In another variation of the invention, a gap may be incorporated between the non-porous membrane and the porous membrane making up the composite. Such a gap may be considered to further limit heat conduction by containing additional low thermal conductivity, stagnant gas. However, this may result in a decrease in transfer rate of chlorine dioxide or other desired species, and this must be taken into consideration. Alternatively, such a gap might contain an intermediate absorbent solution that results in a greater desired selectivity of species.

And while the preceding description relates to production of chlorine dioxide using acidified chlorate feedstock, other reaction mechanisms maybe employed. For instance, chlorine dioxide may be generated using other reducing agents, e.g. $SO_2$, $H_2O_2$, or $CH_3OH$, instead of HCl, or using catalysts such as manganese porphyrin. Further, the invention can be considered for use in other separation processes, for instance in $CO_2$ capture processes to reduce cooling requirements of a hot donor gas.

As those skilled in the art will further appreciate, the principles disclosed herein can be applied to separation in which the donor mixture may instead be in the gas phase, as long as the gas phase mixture is in contact with the non-porous membrane and the other liquid phase, aqueous mixture is in contact with the porous membrane of the composite membrane. The liquid phase, which is selectively receiving species from the gas phase mixture by absorption or reaction, is at a significantly lower temperature than the gas mixture (e.g. more than 30° C. temperature difference). In this way, the cooling requirement may be reduced or eliminated in cases for instance involving absorption of $CO_2$ from hot flue gas to an amine solution or absorption of $SO_3$ from the hot gas exiting a $SO_2$ converter to sulfuric acid solution. For higher temperature gases, glass and ceramic non-porous and porous membranes may be considered too.

The following Examples have been included to illustrate certain aspects of the invention but should not be construed as limiting in any way.

EXAMPLES

Example 1

A series of tests was performed to illustrate the thermal insulation properties of certain exemplary combinations of non-porous and porous membranes and thus their suitability for use in the invention. In all the cases considered, a non-porous PTFE membrane with thickness of 136 micrometers was used. Also in all cases, the porous layers were based on a commercially available expanded PTFE membrane having a porosity of 90% and thickness of 170 micrometers. Porous membranes of varying thickness were then prepared by combining one or more layers of this expanded PTFE membrane together (up to 6 layers in these examples).

These exemplary combinations were then evaluated in a test cell in which recirculating hot water from a hot water supply was passed over the non-porous side of the test composite membranes and recirculating cold water from a cold water supply was passed over the porous side. A heater and a cooler operating at constant heat duty were used to heat and cool the hot and cold water supplies respectively.

The target temperatures and the flow rates for the water supplies were chosen to be similar to those used in a typical commercial chlorine dioxide generation process. However, in those tests where heat transfer through the test composite membranes was substantial, the target temperatures of the recirculating input water supplies could not be sustained with the heater and cooler operating at constant heat duty. The following table lists the measured input and output temperatures of the hot and cold water supplies in each test. The heat transfer coefficient for each was determined from those values. The flow rates for the recirculating hot and cold water were about 0.12 and 0.20 $m^3/h$ respectively.

| | Temperature, ° C. | | | |
|---|---|---|---|---|
| # porous membranes | Hot water in | Hot water out | Cold water in | Cold water out |
| 0 | 47 | 46 | 23 | 23 |
| 1 | 59 | 58 | 12 | 13 |
| 2 | 60 | 59 | 9 | 10 |
| 3 | 61 | 61 | 8.0 | 8.2 |
| 4 | 61 | 60 | 7.7 | 7.9 |
| 5 | 62 | 61 | 7.2 | 7.5 |
| 6 | 61 | 61 | 7.3 | 7.5 |

As is evident from the table above, with 2 or more porous membranes present, a temperature difference greater than 50° C. could be sustained across the test composite membrane.

Figure 5:
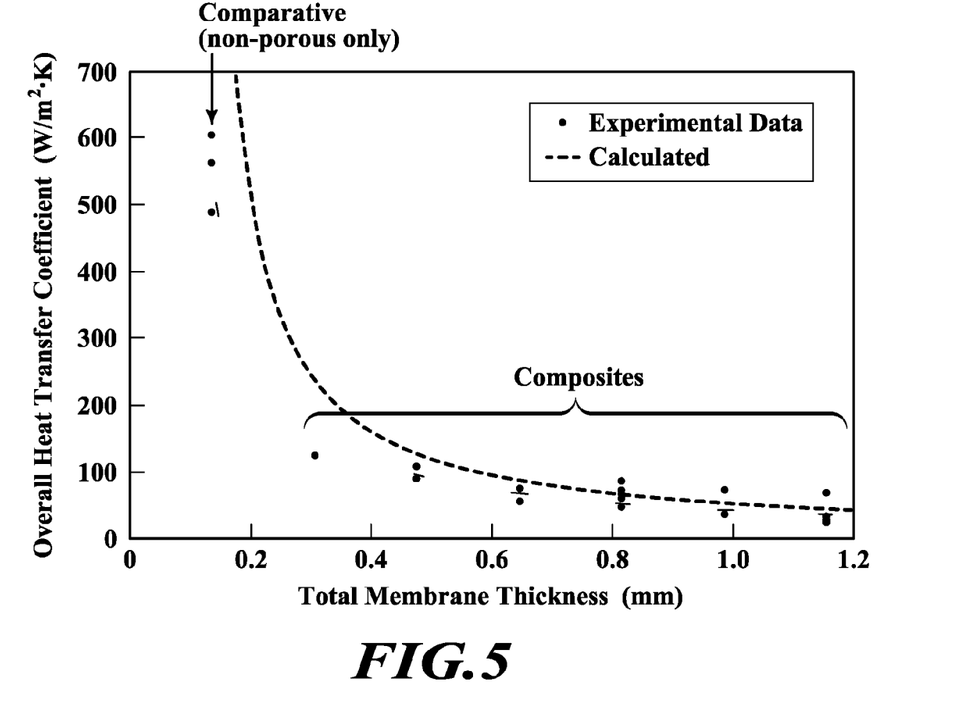
FIG. 5 plots the heat transfer coefficient versus thickness for membrane combinations evaluated in the Examples.

FIG. 5 shows the experimental values determined for the heat transfer coefficients of composite membranes having from 1 up to 6 layers of porous expanded PTFE present, plotted against total composite membrane thickness. Also shown in FIG. 5 are comparative values for the non-porous PTFE by itself (i.e. not a composite combined with any porous membrane). In addition, a plot of the calculated heat transfer coefficients for these combinations, based on literature values and a simple model, is provided in FIG. 5 (dashed line).

The values for the heat transfer coefficients were determined in the following manner. For the experimental values, the overall heat transfer coefficient for either the hot or the cold water was calculated using:

$$U = \frac{(\dot{m}C_p \Delta T)_{Hot \ or \ Cold}}{A_{Membrane} LMTD}$$

where $\dot{m}$ is mass flow, $C_p$ is specific heat, $A_{Membrane}$ is membrane area and LMTD is log mean temperature difference. Since U is different for each of the recirculating hot and cold water supplies, there are thus two possible values for U in FIG. 5 depending on which water supply was being considered. FIG. 5 thus shows both such values and in some cases, additional values arising from repeated testing.

For the calculated values, it was assumed that the pores of the porous membrane layers were filled by air only (which has higher conductivity than either water vapor or chlorine) and that the thermal conductivities for air and PTFE were 0.024 and 0.25 W/m-K respectively. The thermal conductivity of a porous media can generally be calculated as:

$$k_{Porous \ Membrane} = k_{gas}\epsilon + k_{solid}(1-\epsilon)$$

where $\epsilon$ is the membrane porosity and k is the thermal conductivity. Using the aforementioned assumed values, $k_{PorousMembrane}$=0.047 W/m·K. Then, assuming heat transfer happens only by conduction, the overall heat transfer coefficient U was determined using:

$$U = \frac{1}{\sum_i \frac{X_i}{k_i}}$$

where $X_i$ is the thickness of membrane component i.

Figure 6:
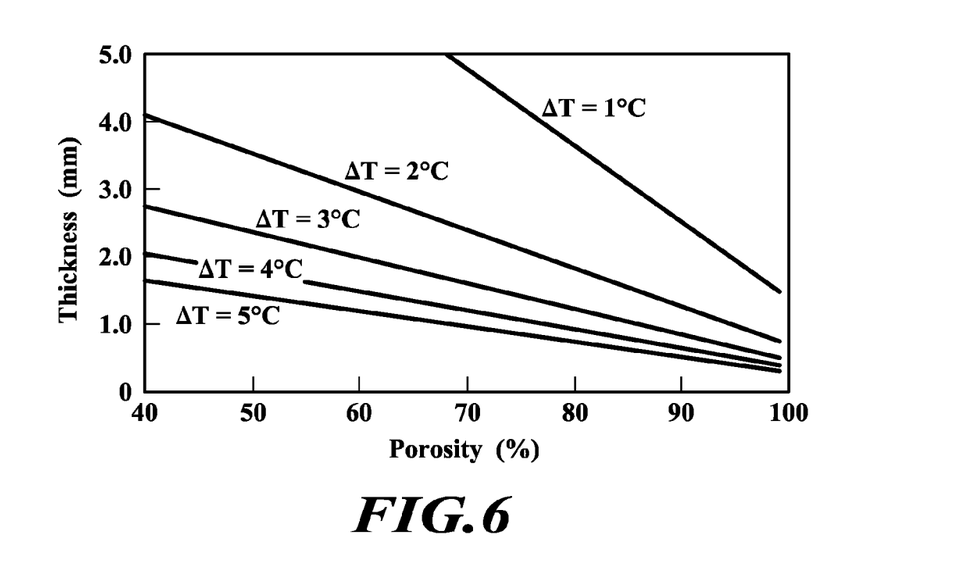
FIG. 6 shows representative increases in recipient mixture temperature as a function of membrane porosity and thickness in an illustrative membrane separation apparatus in the Examples.

Additional calculations were performed to illustrate the expected temperature differences between donor and recipient mixtures in a membrane separation apparatus of the invention, as a function of the porosity and thickness of the porous membrane in the composite membrane. In these calculations, a membrane separation apparatus comprising a 20 m² composite membrane was assumed, with hot and cold water streams flowing across the non-porous and porous sides respectively, each at 10 m³/h flow rate, and with an incoming temperature difference of 30° C. Because the thickness of the non-porous membrane component is very small compared to the overall thickness of the composite membrane, for simplicity the contribution of the non-porous membrane in these calculations was ignored. Thus here, the composite membrane was assumed to comprise only a variable thickness, variable porosity expanded PTFE membrane. FIG. 6 plots representative increases in outlet cold water (recipient) temperature as a function of the porosity and thickness of the porous expanded PTFE membrane.

As is evident from these Examples, composite PTFE membranes can provide the necessary thermal insulation to properly separate aqueous donor and recipient mixtures that differ significantly in temperature, e.g. >30° C. Further, PTFE is acceptable for use as a separation membrane in the harsh corrosive environment present in chlorine dioxide production, is sufficiently permeable to chlorine dioxide, and also provides an adequate selectivity compared to chlorine.

Example 2

A series of tests was performed to illustrate the mass transfer rate of chlorine gas through various non-porous membranes in order to confirm the practical application of the invention. At the same time, the compatibility of the membrane materials was also examined.

Experiments were done using pure chlorine gas at its vapour pressure over liquid chlorine and at room temperature. The chlorine absorption in cold water on the other side of the membrane was measured as well as the slope of pressure decline for chlorine gas.

Some fluoropolymers such as PVDF showed a reduction of pressure on the feed side but no chlorine transfer to water. Test with ECTFE was also showed the same trend, with chlorine gas passage slowly increasing.

Fluoropolymers such as PTFE, PCTFE, FEP, and PFA with no hydrogen atoms on the branches exhibited better compatibility with chlorine and chlorine dioxide. Based on the experimental data for PCTFE, Honeywell HydroBlock 850, the chlorine transfer rate was $1.0 \times 10^{-5}$ m³(STP)·m/m²·h·bar. Assuming selectivity of one for chlorine dioxide over chlorine, the same transfer rate would apply for chlorine dioxide gas too. Using this assumption, for a 50 tonnes per day chlorine dioxide production plant, the required membrane area for transfer of chlorine dioxide would be about 1000 m² which is a reasonable size for a membrane separation apparatus. Since FEP and PFA have higher structural void volume compare to PCTFE, the transfer rate of gases could be higher for these fluoropolymers.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A method for separating a first gaseous species from an aqueous donor mixture and for absorbing the separated first gaseous species in an aqueous recipient mixture using a membrane separation apparatus, wherein the temperature of the aqueous donor mixture is more than 30° C. greater than that of the recipient mixture and the pressure of the aqueous donor mixture is greater than that of the recipient mixture, the method comprising:
   providing a composite membrane in the membrane separation apparatus comprising a non-porous membrane adjacent a porous membrane, wherein the non-porous membrane is permeable to the first gaseous species and the porous membrane has a thickness in the range from about 500 to 5000 micrometers, an average pore size of less than about 1 micrometer, a porosity greater than 50% and is hydrophobic;
   directing the aqueous donor mixture over one surface of the composite membrane at the donor mixture pressure; and
   directing the aqueous recipient mixture over the other surface of the composite membrane at the recipient mixture pressure.

2. The method of claim 1 wherein the composite membrane is oriented such that the non-porous membrane faces the aqueous donor mixture and the porous membrane faces the aqueous recipient mixture and the porous membrane is impermeable to the aqueous recipient mixture at the recipient mixture pressure.

3. The method of claim 1 wherein the aqueous donor mixture comprises a second gaseous species, and the non-porous membrane is permeable to the second gaseous species.

4. The method of claim 3 wherein the first gaseous species is chlorine dioxide and the second gaseous species is chlorine.

5. The method of claim 4 comprising generating chlorine dioxide reaction liquor wherein the aqueous donor mixture is the reaction liquor.

6. The method of claim 5 comprising generating the chlorine dioxide reaction liquor in the membrane separation apparatus.

7. The method of claim 4 wherein the aqueous recipient mixture is chilled water having a temperature of less than 10° C.

8. The method of claim 4 wherein the temperature of the aqueous donor mixture is greater than 50° C.

9. The method of claim 1 where the non-porous membrane is hydrophobic.

10. The method of claim 1 wherein the non-porous membrane material is selected from the group consisting of polytetrafluoroethylene (PTFE), fluorinated ethylene propylene (FEP), ethylene tetrafluoroethylene (ETFE), ethylene chlorotrifluoroethylene (ECTFE), polychlorotrifluoroethylene (PCTFE), perfluoroalkoxy polymer (PFA), polyvinylidene fluoride (PVDF), polypropylene (PP), polyether ether ketone (PEEK), and polysulfone (PS).

11. The method of claim 1 wherein the thickness of the non-porous membrane is in the range from about 0.1 to 50 micrometers.

12. The method of claim 1 wherein the selectivity of the non-porous membrane for chlorine dioxide over chlorine is in the range from about 1 to 1000.

13. The method of claim 1 wherein the porous membrane material is selected from the group consisting of PTFE, FEP, ETFE, ECTFE, PCTFE, PFA, PVDF, PP, and PEEK.

14. The method of claim 1 wherein the porous membrane is an expanded plastic.

15. The method of claim 1 wherein the donor mixture pressure is in the range from about 10 to 150 psig greater than the recipient mixture pressure.

16. The method of claim 1 wherein the composite membrane comprises a second porous membrane adjacent the non-porous membrane and on the surface opposite the porous membrane, and wherein the porous membrane has a porosity greater than 50% and is hydrophobic.

* * * * *